United States Patent [19]

Madaus

[11] Patent Number: 4,580,984
[45] Date of Patent: Apr. 8, 1986

[54] SIMULATED KEYBOARD SYSTEM

[76] Inventor: Kathleen K. Madaus, 20 Franconia St., Worcester, Mass. 01602

[21] Appl. No.: 667,898

[22] Filed: Nov. 2, 1984

Related U.S. Application Data

[63] Continuation of Ser. No. 533,117, Sep. 19, 1984, abandoned.

[51] Int. Cl.⁴ ............................................. G09B 13/02
[52] U.S. Cl. .................................................... 434/227
[58] Field of Search ............... 434/227, 228, 231, 232, 434/233

[56] References Cited

U.S. PATENT DOCUMENTS

| | | | |
|---|---|---|---|
| 662,834 | 11/1900 | Tcerkassov | 434/227 X |
| 1,820,209 | 8/1931 | Bacon | 434/227 |
| 2,053,874 | 9/1936 | O'Donnell | 434/227 |
| 2,154,478 | 4/1939 | Smith | 434/228 |
| 2,802,224 | 8/1957 | Dreisonstok et al. | 434/227 |
| 3,501,849 | 3/1970 | Olsen | 434/233 |

Primary Examiner—William H. Grieb
Attorney, Agent, or Firm—Blodgett & Blodgett

[57] ABSTRACT

Method of teaching keyboarding by providing a first simulated keyboard which is substantially the same size as a standard keyboard and which has means for dividing the keys into appropriate standard finger grouping columns and providing a second simulated keyboard which has means for visually dividing the keys into the same finger grouping columns as the first simulated keyboard. The invention also consists of first and second simulated keyboards for carrying out the above method.

5 Claims, 4 Drawing Figures

SIMULATED KEYBOARD SYSTEM

This is a continuation of co-pending application Ser. No. 533,117 filed on Sept. 19, 1984, now abandoned.

BACKGROUND OF THE INVENTION

This invention is generally directed to a method of teaching keyboarding and apparatus for carrying out the method. The invention is particularly directed to the method of apparatus for teaching keyboarding in connection with the standard keyboard which is used with typewriters and computers.

Traditionally, typing is taught by providing the students with a typewriter to practice proper typing technique. The student is also given exercises for developing finger coordination and familiarization with the keyboard pattern of the typewriter keys. The student is also encouraged to practice typing at home. If a student does not have a typewriter at home, he or she cannot make the same progress in developing typing proficiency as would be the case if a typewriter were readily available to the student outside of the classroom. This problem is particularly accute in the case of learning keyboarding for computer use. The number of people desiring to learn how to use a computer is growing dramatically. Courses in computer usuage include classroom instruction and computer programming or program usuage in actual "hands on" experience with a computer keyboard. In most cases, there are far more students than keyboards and actual practice time on the keyboard for each student is limited. Also, the student is unlikely to have a computer keyboard at home or even a typewriter for additional keyboarding practice. In most cases, the student does not even have access to a typewriter or a computer keyboard outside of the classroom. These and other difficulties experienced with the present keyboard teaching methods and apparatus used with these teaching methods have been obviated by the present invention.

It is, therefore, an outstanding object of the invention to provide a method of and apparatus for teaching keyboarding which does not require the use of an actual computer or typewriter keyboard.

Another object of this invention is the provision of a method of and apparatus for teaching keyboarding which does not require maintenance or repair of equipment.

A further object of the present invention is the provision of a method of an apparatus for teaching keyboarding in which the apparatus is simple and inexpensive so that the entire class of students can participate in keyboarding exercises simultaneously, thus increasing teaching efficiency.

It is another object of the instant invention to provide a method of apparatus for teaching keyboarding in which actual keyboarding practice for the student is made more convenient, thereby allowing students to practice keyboarding anywhere outside of the classroom.

A still further object of the invention is the provision of a method of apparatus for teaching keyboarding in which the student is able to practice keyboarding without typing or computer keyboards, thereby freeing available keyboard terminals for actual computer usuage.

With these and other objects in view, as will be apparent to those skilled in the art, the invention resides in the combination of parts set forth in the specification and covered by the claims appended hereto.

SUMMARY OF THE INVENTION

In general, the invention consists of a method of teaching keyboarding by providing a first simulated keyboard which is substantially the same size of a standard keyboard and which has means for dividing the keys into appropriate standard finger grouping columns and providing a second simulated keyboard which has means for visually dividing the keys into the same finger grouping columns as the first simulated keyboard for enabling the student to view the second keyboard while practicing keyboard techniques on the first keyboard. The invention also consists of a simulated keyboard for carrying out the above method which comprises a representation of keys arranged in a standard keyboard pattern in which the pattern is substantially the same size of that of a standard keyboard and means for dividing the keys of the keyboard into appropriate standard finger grouping columns.

BRIEF DESCRIPTION OF THE DRAWINGS

The character of the invention, however, may be best understood by reference to the accompanying drawings, in which.

DETAILED DESCRIPTION OF THE INVENTION

Figure 4:
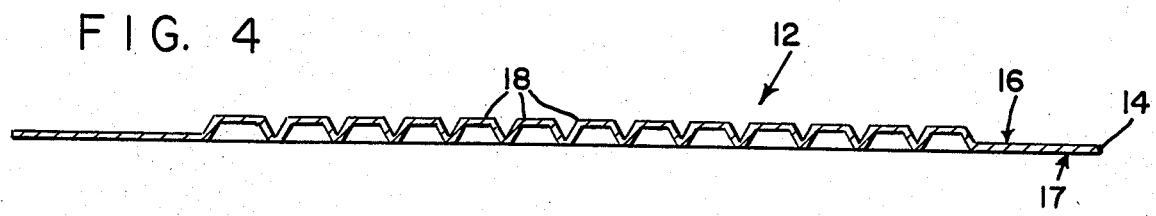
FIG. 4 is a vertical cross-sectional view of the simulated keyboard taken on the line IV—IV of FIG. 2.
Figure 2:
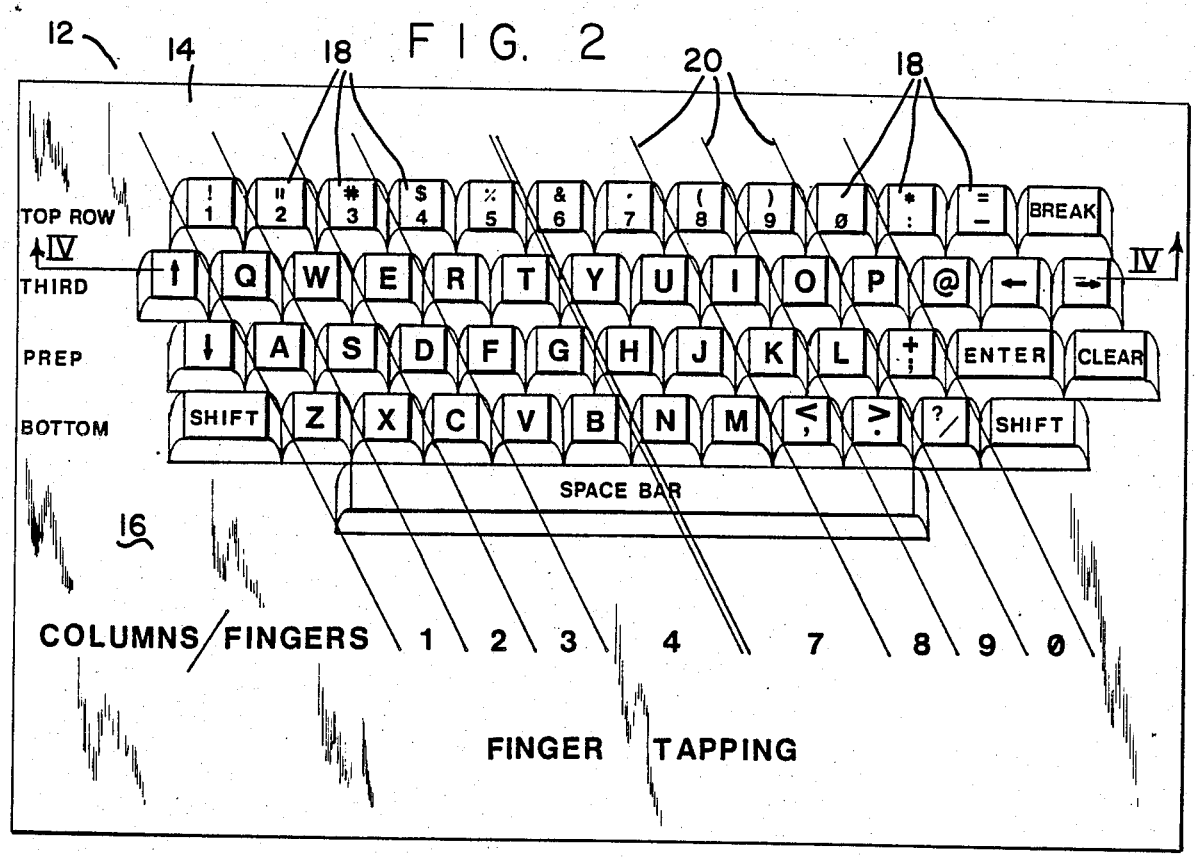
FIG. 2 is a top plan view of the simulated keyboard embodying the principles of the present invention.
Figure 3:
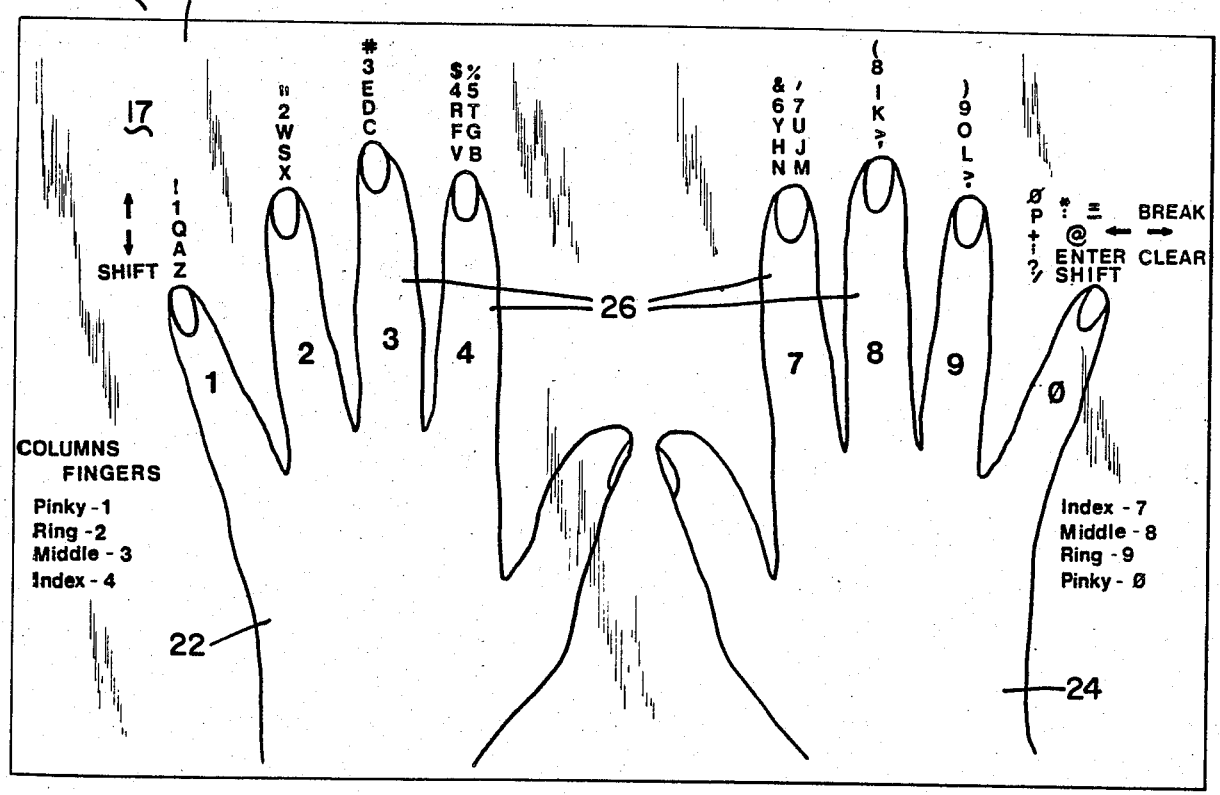
FIG. 3 is a bottom plan view thereof.

Referring first to FIGS. 2-4, the simulated keyboard of the present invention is generally indicated by the reference numeral 12 and consists of a flat mat 14 having a top surface 16 and a bottom surface 17. On the top surface 16 is depicted keys 18 which are arranged in a standard keyboard pattern which consists of horizontal rows and vertical columns of keys. The keys 18 are divided into finger columns 1-10 by lines 20. The finger grouping columns 1-10 correspond to the standard finger groupings for typing.

The bottom surface 17 of the mat as illustrated in FIG. 3 depicts a pair of human hands, the left and right hands being identified by the reference numerals 22 and 24, respectively. The fingers 26 of the hands 22 and 24 are identified by the numbers 1-10 in accordance with the finger groupings 1-10 which are identified on the upper surface 16 of the mat 14 which is illustrated in FIG. 2.

If desired, the mat 14 can be a flat sheet. However, it is preferred that the keys 18 are raised above the general plane of the mat as illustrated in FIG. 4. The keys 18 are raised and separated so as to provide an actual keyboard feel to the user's fingers during keyboard practicing exercises.

Figure 1:
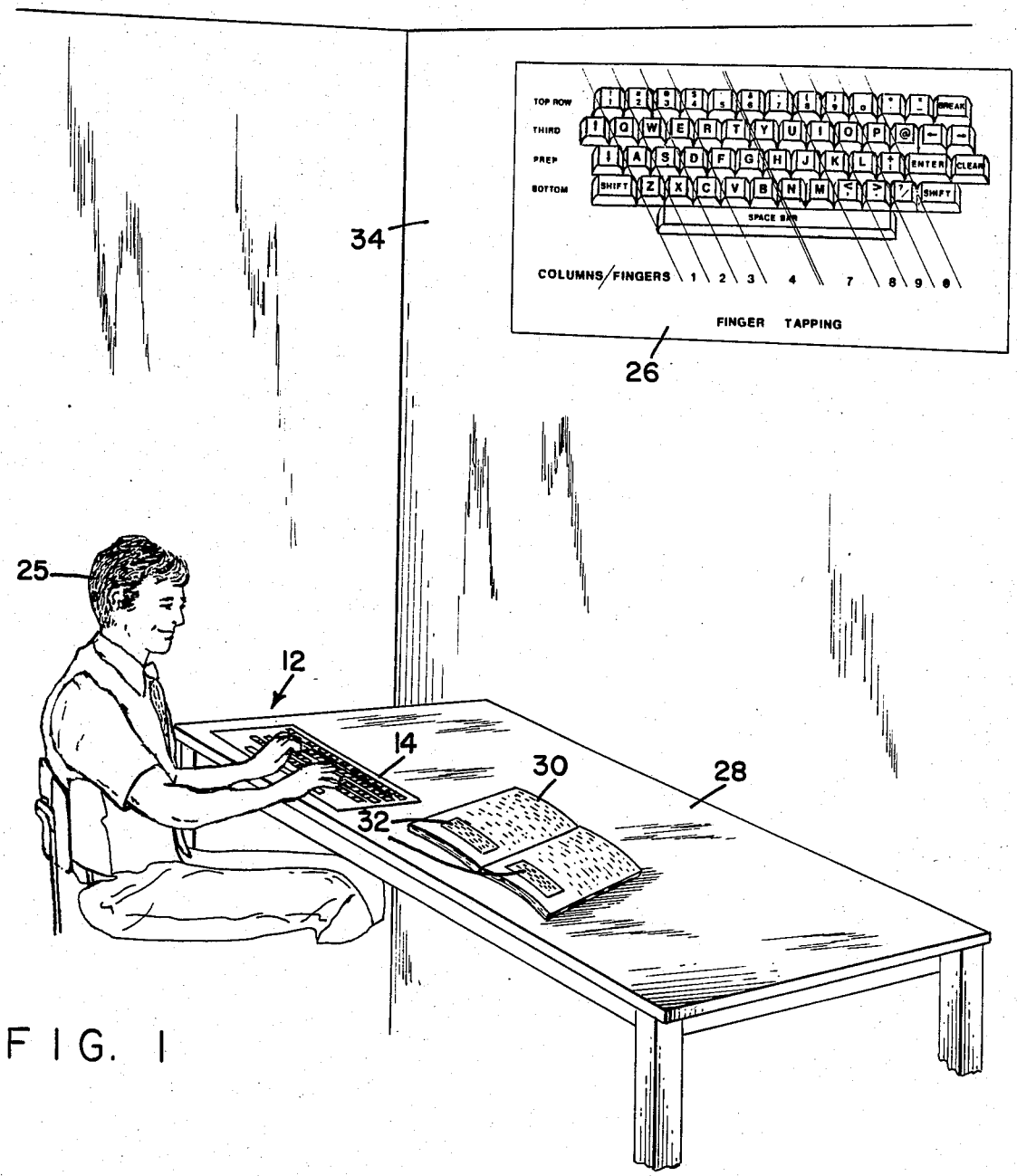
FIG. 1 is a perspective view illustrating the teaching method of the present invention.

The keyboarding method of the present invention as illustrated in FIG. 1, wherein a keyboarding student 25 is shown sitting in front of a table or desk 28 which is used to support the simulated keyboard 12 of the present invention. An instruction book 30 of keyboarding exercises is also supported on the table 28. The book 30 contains illustrations 32 of the simulated keyboard surface 16 which is illustrated in FIG. 2. A wall chart 26 is mounted on the wall 32 which is located behind the table 28 facing the student 25. The chart 26 contains an illustration of the simulated keyboard which is depicted on surface 16 of the mat 14.

The method of teaching keyboarding to a student comprises providing the student 25 with a simulated keyboard such as mat 14 in which the keys are divided into appropriate standard finger-grouping columns. This enables the fingers of the students hands to be placed on the surface 16 of the keyboard in a traditional keyboarding posture as shown in FIG. 1. The student is then provided with a second simulated keyboard which has means for visually dividing the keys into the same grouping columns as the mat 14. In a typical classroom setting, the second simulated keyboard consists of the wall chart 26 which is also illustrated in FIG. 1. The student is provided with keyboarding exercises by the instructor and performs those exercises with his or her fingers on the mat 14 while viewing the keyboard pattern depicted on the wall chart 26. When the student is out of the classroom setting, he or she can continue to practice keyboarding by manipulating his or her fingers in keyboarding exercises on the mat 14 while looking at the illustrations 32 in the instruction book 30. The second simulated keyboard which is used in conjunction with the first simulated keyboard 12 may be represented by the illustrations 32 of the instruction book 30 or the wall chart 26. If desired, the wall chart 26 in the book 30 may both be used simultaneously with the mat 14 as shown in FIG. 1 in or out of a classroom setting. For example, the chart 26 can be used by the instructor to point out finger groupings and keys in explaining certain keyboard exercises and the student can follow these exercises in the book 30. Each student can also be provided with his or her own wall chart for use at home with the mat 14 and the instruction book 30.

It is contemplated that finger groupings 1–10 can be divided by having the keys of each group distinctly identified from the keys of the other group. In one embodiment, the group of keys are distinguished by color. In another embodiment, the groups of keys are distinguished by texture. If desired, the finger groupings may be distinguished by color and texture.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Simulated keyboard system for teaching keyboarding to students comprising:
   (a) a mat having an upper surface, and a bottom surface
   (b) a representation of keys arranged in a standard keyboard pattern on said upper surface in which the keys are permanently identified, said keys and pattern being substantially the same size as that of a standard keyboard for enabling the student to position his or her fingers in a traditional keyboarding posture, including a plurality of lines for dividing the keys of said keyboard into appropriate standard finger grouping columns for assisting the student in maintaining his or her fingers in the appropriate grouping columns while practicing keyboarding technique on said simulated keyboard,
   (c) a representation of a pair of human hands on said bottom surface,
   (d) each finger of each hand identifies indicia on said bottom surface which identifies with the appropriate keys of the finger group for the finger,
   (e) a wall chart which depicts a second simulated keyboard in which the individual keys of the keyboard are permanently identified and which has lines which divide the keys into appropriate finger grouping columns for enabling the student to view said second keyboard while manipulating his or her fingers on said first simulated keyboard in keyboarding exercises, and
   (f) an instruction book of keyboarding exercises which contains illustrations of a third simulated keyboard which is depicted in the same manner as said first and second keyboards for enabling the student to view the third keyboard while manipulating his or her fingers on said first keyboard while following the keyboarding exercises in the book.

2. Simulated keyboard as recited in claim 1, wherein the keys are raised from the remainder of said upper surface.

3. Simulated keyboard as recited in claim 2, wherein said keys of each group are distinctly identified from the keys of the other groups.

4. Simulated keyboard as recited in claim 3, wherein the group of keys are distinguishable by color.

5. Simulated keyboard as recited in claim 3, wherein the groups of keys are distinguished by texture.

* * * * *